(12) United States Patent
Jordan et al.

(10) Patent No.: US 9,748,746 B1
(45) Date of Patent: Aug. 29, 2017

(54) LOCK-IN-PLACE FEEDING SHEAVE ASSEMBLY

(71) Applicants: David S. Jordan, Knoxville, TN (US); Michael C. Jordan, Knoxville, TN (US)

(72) Inventors: David S. Jordan, Knoxville, TN (US); Michael C. Jordan, Knoxville, TN (US)

(73) Assignee: iTool Equipment Holding LLC, Oak Ridge, TN (US)

( * ) Notice: Subject to any disclaimer, the term of this patent is extended or adjusted under 35 U.S.C. 154(b) by 4 days.

(21) Appl. No.: 14/756,136

(22) Filed: Aug. 5, 2015

(51) Int. Cl.
*H02G 1/08* (2006.01)
*B65H 57/14* (2006.01)

(52) U.S. Cl.
CPC ............... *H02G 1/08* (2013.01); *B65H 57/14* (2013.01)

(58) Field of Classification Search
CPC .................................. H02G 1/08; B65H 57/14
See application file for complete search history.

(56) References Cited

U.S. PATENT DOCUMENTS

| 2,946,559 A * | 7/1960 | Pickett .................. B65H 57/14 254/134.3 PA |
| 2015/0353319 A1* | 12/2015 | Henderson ........... H02G 3/0456 248/68.1 |

* cited by examiner

*Primary Examiner* — Monica Carter
*Assistant Examiner* — Nirvana Deonauth
(74) *Attorney, Agent, or Firm* — Michael E. McKee (57) ABSTRACT

A feeding sheave assembly for use at the open end of a conduit into which a wire or cable is to be fed during a wire or cable-pulling operation includes an elongated sleeve portion which is insertable endwise into the open end of the conduit and an abutment plate for abutting the open end of the conduit when the sleeve portion is fully inserted within the conduit. An arrangement is provided for releasably locking the sleeve portion in a stationary relationship with the conduit, and a sheave is rotatably mounted upon the abutment plate so that when the sleeve portion is releasably locked within the open end of the conduit, a wire or cable which is directed into the conduit end during a wire or cable-pulling operation moves across and then off of the peripheral roller surface of the sheave before moving into the conduit end.

18 Claims, 6 Drawing Sheets

LOCK-IN-PLACE FEEDING SHEAVE ASSEMBLY

BACKGROUND OF THE INVENTION

This invention relates generally to means and methods for feeding a wire or cable through a conduit and relates, more particularly, to accessories used for guiding a wire or cable being fed into a conduit.

The class of accessories with which this invention is to be compared includes those which are utilized adjacent an end of a conduit into which a wire or cable is being fed as an aid for guiding the wire or conduit being fed into the conduit.

It would be desirable to provide an improved accessory of the aforedescribed class.

Accordingly, it is an object of the prevent invention to provide a new and improved assembly, or accessory, which can be positioned in cooperating relationship with an end of a conduit into which a wire or conduit is intended to be fed and which helps to guide the wire or cable being fed into the conduit.

Another object of the present invention is to provide such an assembly for guiding the wire or cable which is being fed into the conduit so that the wire or cable is prevented from engaging any edge which encircles the end of a conduit into which the wire or cable is being fed.

Still another object of the present invention to provide such an assembly which is relatively compact in size and which can be releasably locked in a stationary relationship with the end of the conduit into which the wire or cable is being fed.

Yet another object of the present invention is to provide such an assembly which includes a sheave across which the wire or cable being fed into the conduit is guided during a wire or cable pulling operation.

A further object of the present invention is to provide such an assembly which is capable of being used with conduits of various diameters and thicknesses.

A still further object of the present invention is to provide such an assembly which is well-suited for securement to an end of a conduit which is provided with external threads for reducing the likelihood of damage to the threads when the assembly is secured thereto.

A yet further object of the present invention is to provide such an assembly which can be manipulated into place within a conduit into which a wire or cable is readied for purposes of pulling the wire or cable into the conduit.

One more object of the present invention is to provide such a device which is uncomplicated in structure, yet effective in operation.

SUMMARY OF THE INVENTION

This invention resides in a feeding sheave assembly for use at the open end of a conduit into which a wire or cable is to be fed during an operation involving the pulling of the wire or cable through the conduit wherein the conduit is encircled by an edge.

The feeding sheave assembly includes an elongated sleeve portion having opposite first and second ends and a hollow interior and which is sized to be accepted by the hollow interior of the conduit when the sleeve portion is inserted endwise into the open end of the conduit. The assembly also includes means defining an abutment surface at the first end of the sleeve portion so that when the sleeve portion is inserted second-end first into the open end of the conduit toward a fully-inserted condition within the hollow interior of the conduit, the abutment surface is moved into abutting engagement with the open end of the conduit and thereby prevents further insertion of the sleeve portion into the conduit beyond the fully-inserted condition. A sheave is provided which is rotatably mounted upon the abutment surface-defining means, and the sheave has a peripheral roller surface across which the wire or cable is routed during a wire or cable-pulling operation. In addition, the sheave is disposed in such a relationship with respect to the sleeve portion so that when the sleeve portion is positioned in its fully-inserted condition within the hollow interior of the conduit, a wire or cable which is subsequently routed across the roller surface of the sheave and directed into the open end of the conduit is prevented from engaging the edge which encircles the open end of the conduit. Moreover, the assembly includes means for releasably locking the sleeve portion in a stationary relationship with respect to the conduit when the sleeve portion is positioned in its fully-inserted condition within the hollow interior of the conduit.

DETAILED DESCRIPTION OF AN ILLUSTRATIVE EMBODIMENT

Figures 1, 2:
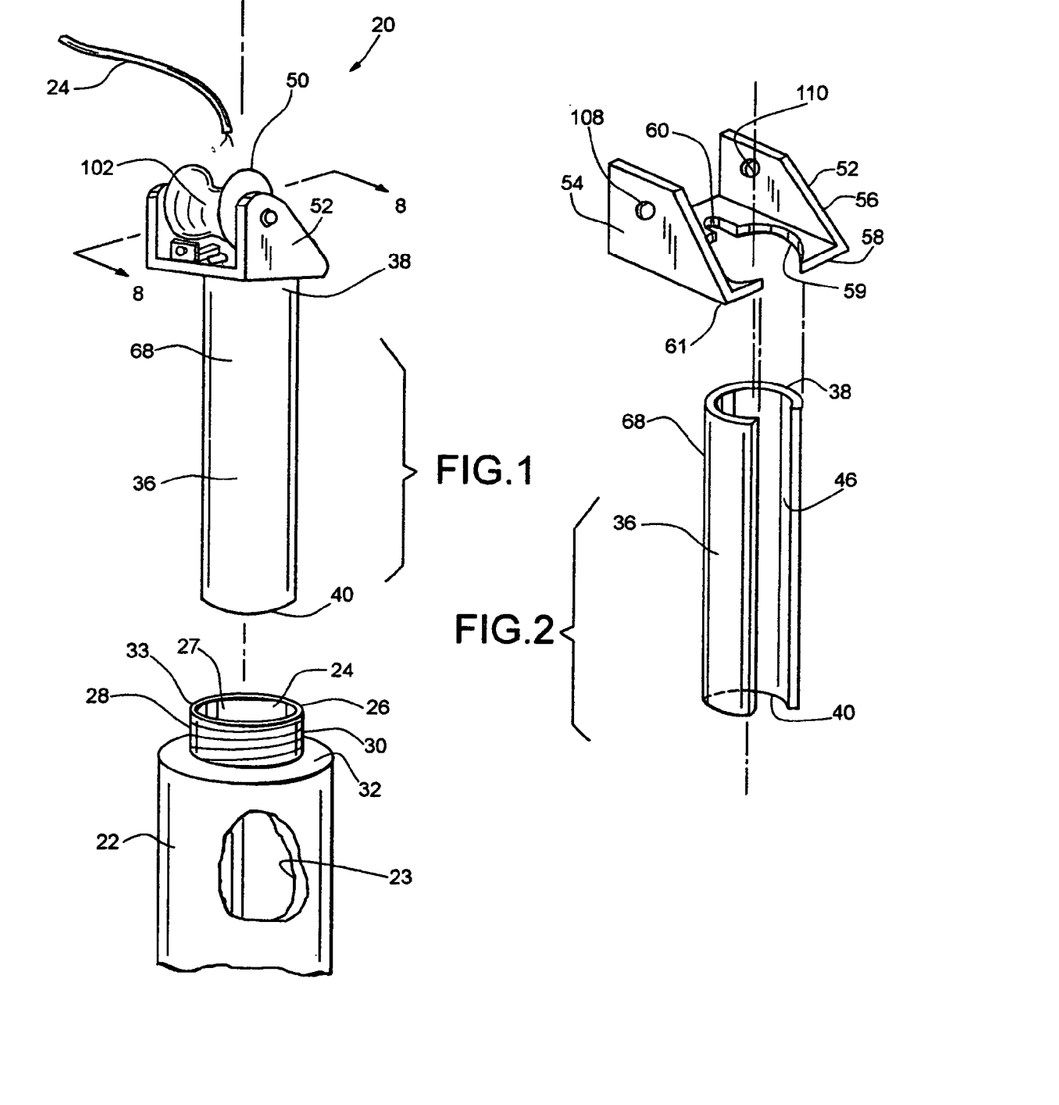
FIG. 1 is a perspective view of an embodiment of a feeding sheave assembly within which features of the present invention are embodied and a conduit, shown partially cut-away, with which the embodiment of the feeding tube assembly is utilized for routing a wire or cable through the interior of the conduit.
FIG. 2 is a perspective view of the tubular portion and bracket of the FIG. 1 embodiment, shown exploded.

Turning now to the drawings in greater detail and considering first FIG. 1, there is illustrated an embodiment, generally indicated 20, of a feeding sheave assembly within which features of the present invention are embodied shown ready for placement in an environment of intended use. In particular, the FIG. 1 environment of intended use includes a conduit 22 (e.g. of a class commonly used in the construction of buildings) through which a wire (e.g. an electrical power wire) or cable 24 is desired to be routed by way of a wire or cable-pulling operation. The conduit 22 has an open end 26 into which the wire or cable 24 is fed during the wire or cable-pulling operation. In other words, the conduit end 26 is the upstream, or feeding, end of the conduit 22 into which the wire or cable 24 is fed during a wire or cable-pulling process. As will be apparent herein, the feeding sheave 20 is capable of being mounted upon the conduit end 26 in a stationary relationship with respect thereto to provide an aid for guiding the wire or cable 24 into the conduit end 26.

With reference still to FIG. 1, the depicted conduit 22 through which the wire or cable 24 is desired to be pulled is cylindrical in shape and includes a hollow interior 23 and a central opening 25 which extends through the hollow interior 23. The conduit end 26 terminates in a plane which is substantially normal to the longitudinal axis of the depicted conduit 22 and provides a mouth 27 at the entrance of the conduit end 26. As is common with conduits in this class of environments, the depicted conduit 22 embodies a male connector end portion 28 which includes an externally-threaded cylindrical portion 30 of reduced diameter which extends away from a shoulder surface 36 and terminates at an edge, indicated 33, which encircles the mouth 27. As will be apparent herein, it is this cylindrical portion 30 to which the feeding sheave assembly 20 is releasably locked so that when clamped to the conduit end portion 28, the feeding sheave assembly 20 provides a guideway which enables the wire or cable 24 to be moved toward and into the mouth 27 of the conduit opening 25 without the wire or cable 24 having to engage, or be pulled across, the edge 33 of the mouth 27. In as much as the edge 33 could be relatively sharp, the feeding sheave 20 permits the wire or cable 24 which is being pulled through the conduit 22 from engaging the edge 33 and thus reduces the likelihood that neither the wire or cable 24 nor the edge 33 of the mouth 27 will be damaged as the wire or cable 24 is moved around or across the edge 33.

With reference to FIGS. 1 and 2, the feeding sheave 20 includes an elongated sleeve portion 36 which is substantially C-shaped in cross section and has two opposite first and second ends 38 and 40, respectively. In addition, the sheave portion 36 is open along one side thereof so as to provide two opposing edges 42 and 44 which extend axially along the sleeve portion 36 for the full length thereof and which provide a spacing 46 between the opposing edges 42 and 44. As will be apparent herein, the spacing 46 provides an access slot into which a wire or cable 24 can be accepted by the interior, indicated 48, of the sleeve portion 36 when, or if, sleeve portion 36 is moved, or manipulated, sidewise over a length of the wire or cable 24. Preferably, the sleeve portion 36 is constructed of steel, but any of a number of alternative materials can be used to construct the sleeve portion 36. Attached to one, i.e. the first, end 38 of the sleeve portion 36 are additional components, described herein, which enable the sleeve portion 36 to be locked, or clamped, in a fully-inserted position within the conduit 22 and also includes a rotatable sheave 50 across which the wire or cable 24 is routed as the wire or cable 24 is moved, i.e. pulled, into the conduit end 26 and along the length of the conduit 22. In addition, the sleeve portion 36 defines an outer surface 68 which extends between the first and second ends 38 and 40 and which, as will be apparent herein, plays a role in the locking of the sleeve portion 36 to the conduit end 26.

In particular and with reference to FIGS. 2-5, the afore-mentioned additional components includes a bracket 52 which is substantially U-shaped in cross section having a pair of opposite leg portions 54 and 56 and a base portion 58 which extends between and joins the leg portions 54 and 56 together at one end thereof. If desired, the bracket 52 can be formed from a single piece of material (e.g. steel) which is appropriately bent to form the U-shape of the bracket 52. Each of the leg portions 54, 56 and the base portion 58 is substantially platen in form, and the base portion 58 defines an arcuate-shaped cutout 59 whose edges substantially conform in shape to the shape of the edges (i.e. the arcuate, near-circular-shaped edges of) the first end 38 of the sleeve portion 36, and further includes a centrally-disposed slot 60 which opens into the arcuate-shaped cutout 59 for a reason which will be apparent herein. The base portion 58 of the depicted bracket 52 includes opposite side faces 61 and 63 and is arranged against the sleeve portion 36 (so that the leg portions 54, 56 are directed from the base portion 58 from the side face 63 thereof opposite the sleeve portion 36), and the base portion 58 is joined, as by welding, to the first end 38 of the sleeve portion 36 so that the edges of the cutout 59 extend along the edges of the first end 38 of the sleeve portion 36. With the bracket 52 fixedly joined to the sleeve portion 36 in such a manner, the surface of the side face 61 of the base portion 58 is disposed outboard of the first end 38 of the sleeve portion 36.

Figure 9:
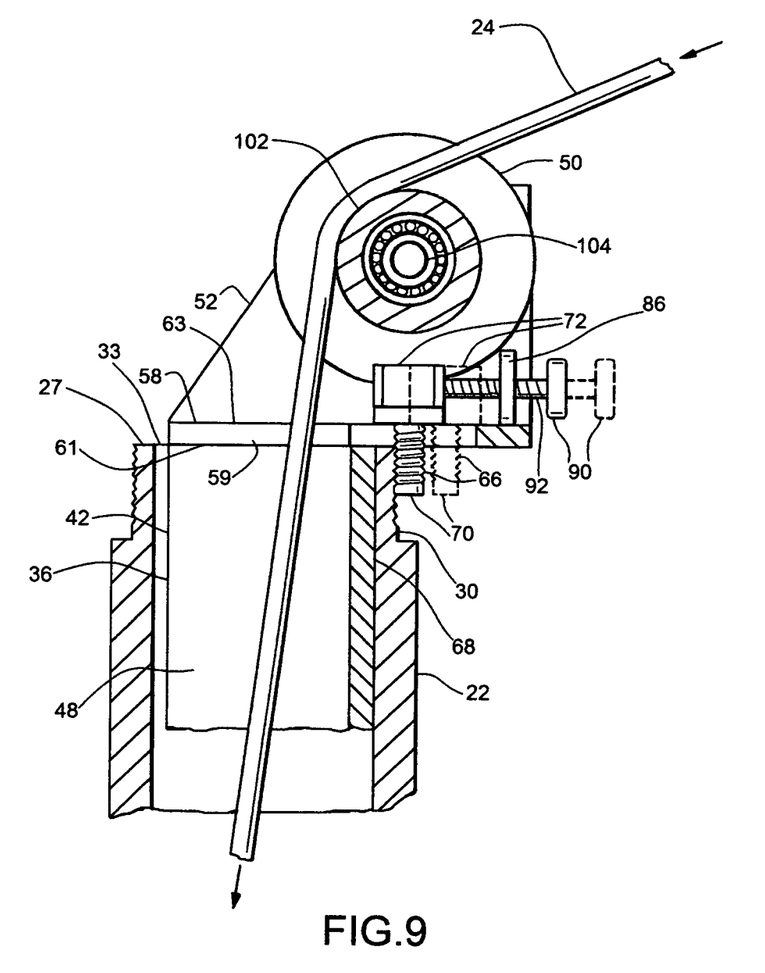
FIG. 9 is a longitudinal cross-sectional view of the FIG. 1 embodiment, similar to that of FIG. 8, shown positioned within and clamped to the FIG. 1 conduit for guiding a wire or cable desired to be routed (i.e. pulled) through the conduit.

It is a feature of the sheave assembly 20 that its sleeve portion 36 is adapted to be inserted endwise (i.e. second-end 40-first) into the conduit end 26 until the edge 33 of the mouth 27 of the conduit 22 abuts the aforementioned surface of the side face 61 of the base portion 58 so that the sleeve portion 36 cannot be advanced any further along the length of the conduit 22. With the surface of the side face 61 of the base portion 58 disposed in abutting relationship with the edge 33 of the mouth 27 of the conduit 22 in such a manner (and as illustrated in FIG. 9), the sheave assembly 20 is disposed in a fully-inserted condition within the conduit end 26. It follows that the diameter (or size) of the elongated sleeve portion 36 (as measured across its C-shaped cross section) is slightly less than the diameter (or size) of the opening 25 of the conduit 22 within which the assembly 20 is intended to be positioned for use, and the base portion 58 (and more specifically, the surface of the side face 61 thereof) is large enough to prevent the base portion 58 from being accepted by (i.e. or passing into) the conduit end 26. It therefore follows that the side face 61 provides an abutment surface which moves into abutting engagement with the edge 33 of the mouth 27 of the conduit 22 when the sleeve portion 36 is inserted second end 40-first into the conduit 22 to thereby prevent the further insertion of the sleeve portion 36 into the conduit 22 beyond the fully-inserted condition. As will be apparent herein, with the sheave assembly 20 disposed in a fully-inserted condition within the conduit end 26 in such a manner, a wire or cable 24 being routed into the conduit end 22 passes through the bracket 52 and into the interior 48 of the sleeve portion 36 by way of the arcuate-shaped cutout 59 provided in the base portion 58 of the bracket 52.

Figure 3:
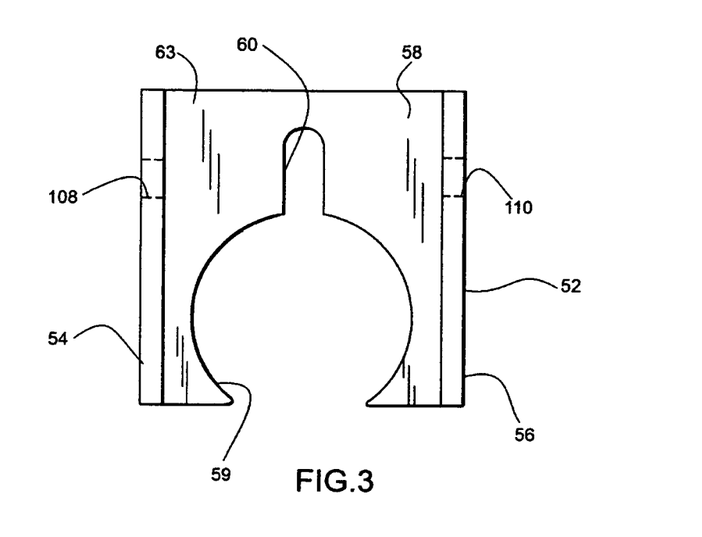
FIG. 3 is a top plan view of the bracket depicted in FIG. 2.
Figure 4:
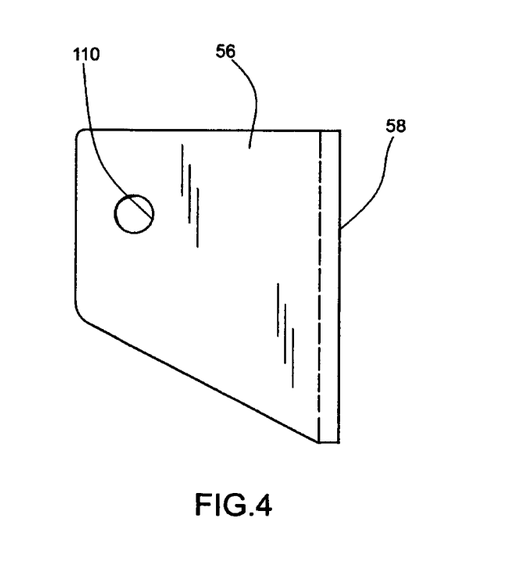
FIG. 4 is a side elevation view of the FIG. 2 bracket as seen generally from the right in FIG. 3.

As best shown in FIG. 3, the centrally-disposed elongated slot 60 is oriented along the side face 63 of the base portion 58 so that the longitudinal axis of the slot 60 is oriented substantially parallel to each of the leg portions 54 and 56. As will be apparent herein, the slot 60 provides a guideway along which an externally-threaded stud, described herein, is permitted to slide substantially toward and away from the cutout 59.

Figure 5:
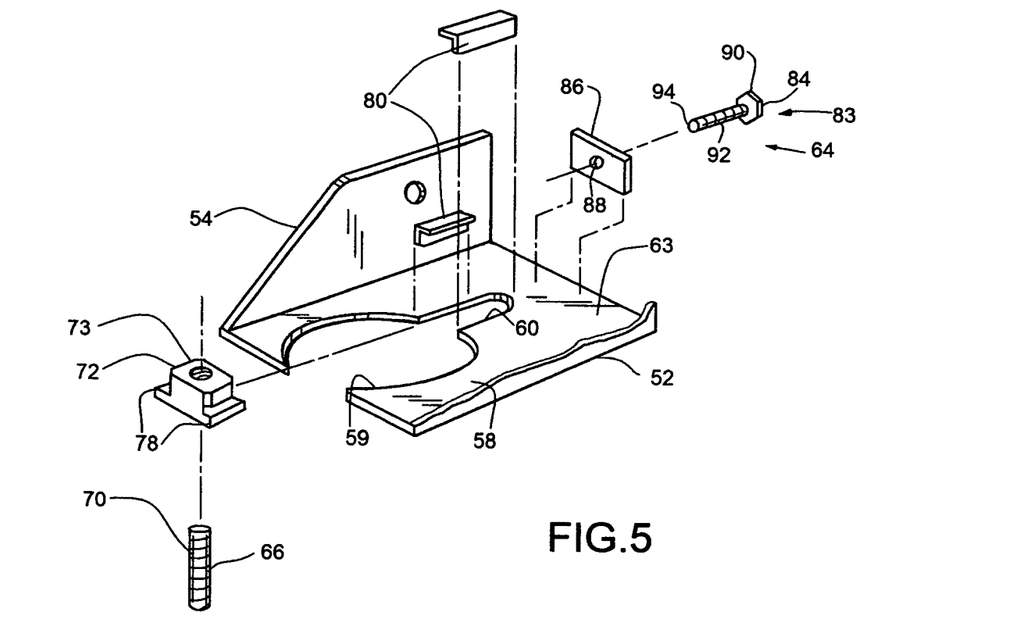
FIG. 5 is an exploded perspective view of the bracket of FIG. 2 and associated componentry used for clamping the FIG. 1 embodiment to the conduit of FIG. 1.
Figure 6:
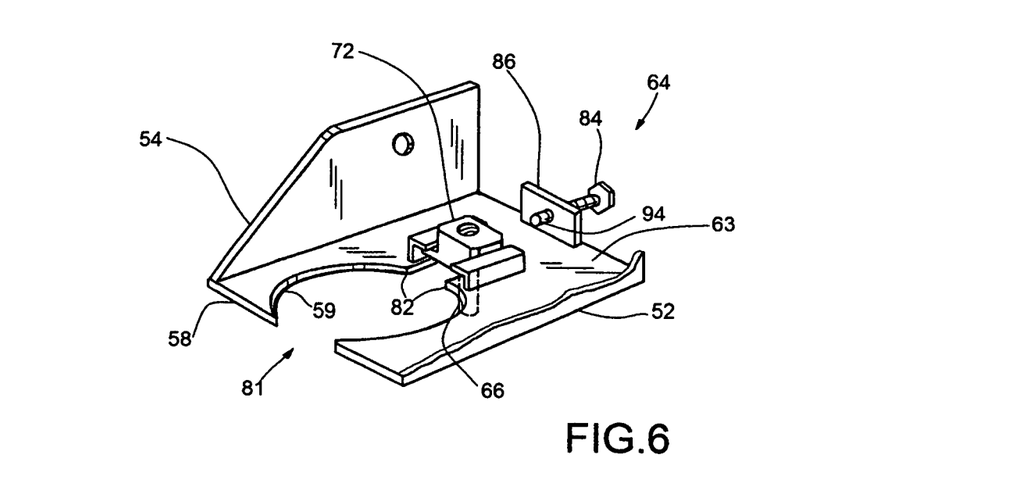
FIG. 6 is a perspective view of the bracket and associated componentry of FIG. 5, shown assembled.
Figure 8:
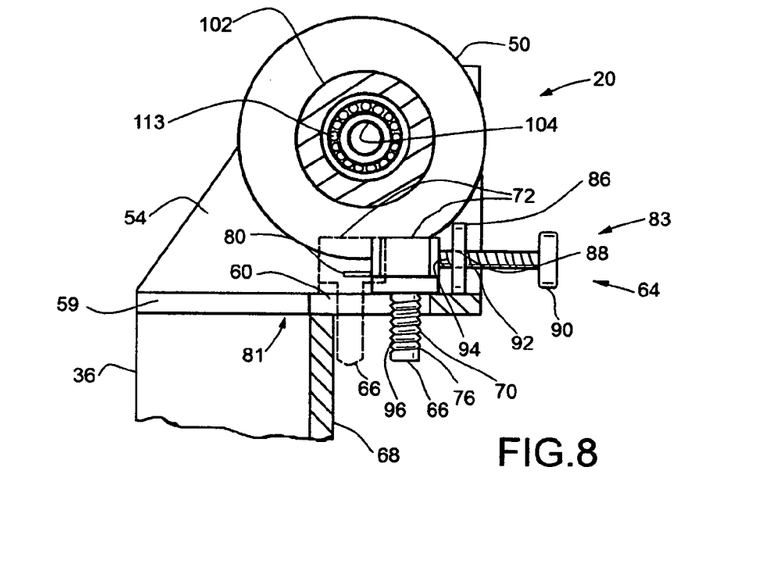
FIG. 8 is a longitudinal cross-sectional view of a fragment of the FIG. 1 embodiment taken about along line 8-8 of FIG. 1.

With reference to FIGS. 5, 6 and 8, it is also a feature of the feeding sheave assembly 20 that it includes means, generally indicated 64, for releasably locking, or clamping, the sleeve portion 36 in a stationary relationship with the conduit 22 when the feeding sheave assembly 20 or, more specifically, the sleeve portion 36 thereof, is disposed in its fully-inserted condition within the conduit 22. Within the depicted sheave assembly 20, the means 64 for releasably locking includes a stud member 66 which is mounted upon the base portion 58 of the bracket 52 for movement toward and away from the outer surface 68 (FIG. 8) of the sleeve portion 36 so that by positioning the feeding sheave assembly 20 into its fully-inserted condition within the conduit 22 so that the externally-threaded end portion 30 (FIG. 1) of the conduit 22 is disposed between the stud member 66 (FIGS. 5, 6 and 8) and the outer surface 68 of the sleeve portion 36 and then tightening the stud member 66 against the externally-threaded end portion 30 of the conduit 22, the end portion 30 is tightly sandwiched between the stud member 66 and the outer surface 68 to thereby lock the sheave assembly 20 to the conduit 22 adjacent the end 26 thereof.

In connection with the foregoing, the stud member 66 of the depicted sheave assembly 20 is in the form of an externally-threaded stud 70 which is positioned within the centrally-disposed slot 60 for movement along the length of the slot 60, and there is provided a nut 72 having an internally-threaded opening 73 within which a fraction of the stud 70 is threadably received so that as the nut 72 rests against the side face 63 of the base portion 58 of the bracket 52, the remaining section, indicated 76 in FIG. 8, depends downwardly through the slot 60 (as viewed in FIG. 8) and beneath the side face 61 of the base portion 58.

Furthermore and with reference again to FIG. 5, the nut 72 includes a main body 73, and there is attached to the main body 73 a pair of wing portions 78 which extend outwardly of the main body 73 on opposite sides thereof. In addition, there is associated with the base portion 58 a pair of guide rails 80 which are substantially L-shaped in cross section and which are attached (e.g. welded) to the side face 63 of the base portion 58 along the opposite sides of the slot 60 so as to provide, with the surface of the side face 63, a guideway, generally indicated 81 in FIG. 6, including a pair of substantially parallel guide tracks 82 within which the wing portions 78 are positioned for sliding movement therealong. In other words, with the wing portions 78 of the nut 72 disposed within the guide tracks 82, the externally-threaded stud 70 extends downwardly of the base portion 58 through the slot 60 (best shown in FIG. 8), and the stud 70 is free to be moved along the length of the slot 60 (and along a path which extends substantially toward and away from the outer surface 68) as the nut 72 is guided along the length of the guide tracks 82.

The means 64 for releasably locking also includes means, generally indicated 83 in FIGS. 5, 6 and 8, for moving the nut 72 along the length of the slot 60 and toward the outer surface 68 of the sleeve portion 36. Within the depicted sheave assembly 20, the means 83 for moving includes a bolt 84 which is mounted upon the bracket 52 for movement toward and into engagement with a side surface of the nut 72. In addition, there is provided a platen flange 86 having a centrally-disposed internally-threaded opening 88 which is attached (e.g. welded) along one edge against the side face 63 of the base portion 58 so that the planar form of the flange 86 extends away from the side face 63 of the base portion 58 and so that the center axis of the internally-threaded opening 88 is oriented substantially parallel to the longitudinal axis of the slot 61, as best shown in FIG. 6. The bolt 84, having a head 90 and a shank 92 which extends from the head 90 so as to terminate at an end 94, is threaded within the opening 88 of the platen flange 86 so that the shank end 94 faces a surface of the nut 72 on a side thereof opposite the outer surface 68 of the sleeve portion 36.

Therefore and when the nut 72 is disposed along the length of the slot 60 furthest from the outer surface 68 (as depicted in solid lines in FIG. 8), there exists a gap, indicated 96 in FIG. 8, between the stud 70 and the outer surface 68 of the sleeve portion 36 which is capable of accepting the edge 33 of the mouth 27 of the conduit 22 when the sleeve portion 36 is inserted into its fully-inserted condition within the conduit 22. With the edge 33 of the conduit mouth 27 disposed within the gap 96 in such a manner, the head 90 of the bolt 84 can then be rotated in an appropriate rotational direction with respect to the flange 86 to move the end 94 of the bolt shank 92 toward and into engagement with the nut 72. Continued rotation of the bolt head 90 effects the movement of the nut 72 along the length of the slot 60 as the end 94 of the bolt shank end 94 moves against the nut 72. It follows that each of the nut 72 and stud 70 can be moved along the length of the slot 60 from, for example, the condition depicted in solid lines in FIG. 8 to the condition depicted in phantom in FIG. 8. Moreover and because the wing portions 78 of the nut 72 are maintained in a captured condition within the guide rails 80 as the nut 72 is permitted to slidably move along the length of the slot 60, the guide rails 80 help to maintain the nut 72 and stud 70 in a substantially normal (rather than a canted) relationship with respect to the surfaces of the side faces 61 and 63 as the nut 72 is pushed along one side face 63 of the base portion 58 as the stud 70 bears against the conduit 22 on the other side face 61 of the base portion 58.

It also follows that when the sleeve portion 36 is disposed within its fully-inserted condition within the conduit 22 as is depicted in FIG. 9 and as the nut 72 is moved along the length of the slot 60 by way of the bolt 90, the externally-threaded stud 70 is moved toward the externally-threaded cylindrical portion 30 of the conduit 22 by a corresponding amount. Eventually, the rotation of the bolt head 90 presses the cylindrical portion 30 of the conduit 22 against the outer surface 68 (by way of the stud 70) so that the cylindrical portion 30 becomes tightly sandwiched between the stud 70 and the outer surface 68 of the sleeve portion 36. With the cylindrical portion 30 sandwiched between the stud 70 and the outer surface 68 in such a manner, the feeding sheave assembly 20 becomes clamped, and thus locked-in-place, in a stationary relationship with the conduit 22.

Figure 7:
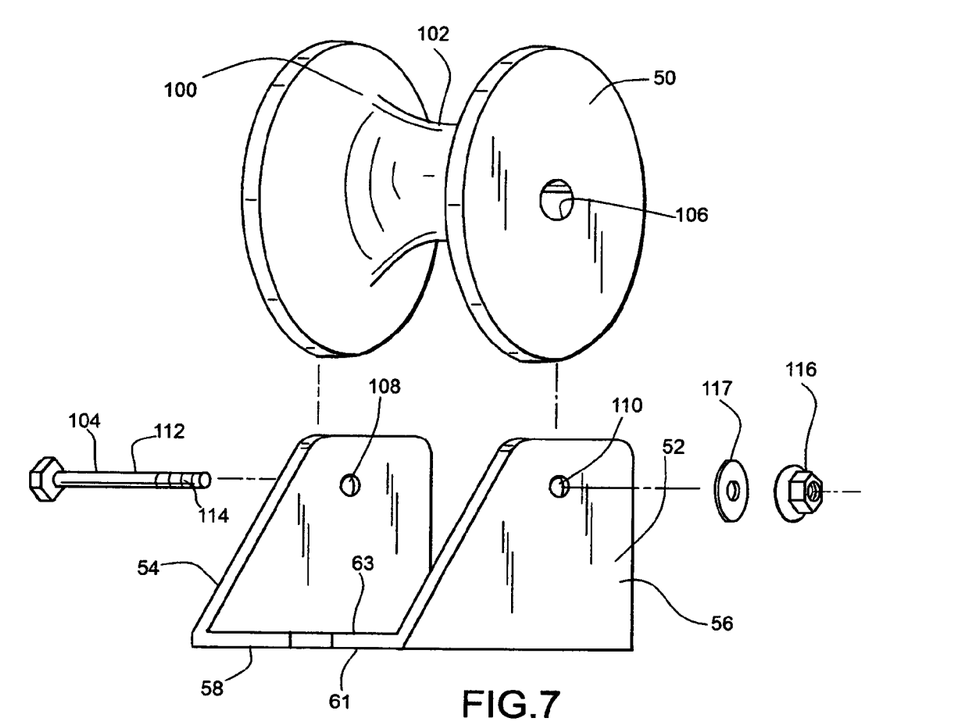
FIG. 7 is perspective view of the bracket and sheave of the FIG. 1 embodiment, shown exploded.

With reference to FIG. 7, the sheave assembly 20 includes the sheave 50, introduced earlier, which is mounted for rotation upon the bracket 52. The sheave 50 includes a spool-shaped body 100 having a roller surface 102 across which the wire or cable 24 can be routed for movement thereacross and which is journaled to the bracket 52 by way of a headed bolt 104. In this regard, the sheave body 100 has a central through-opening 106, and each leg portion 54 or 56 includes a through-opening 108 or 110 which is aligned with the through-opening 110 or 108 of the other leg portion 56 and 54. In order to attach the sheave 50 to the bracket 52, the sheave 50 is positioned between the leg portions 54 and 56 of the bracket 52 so that the central through-opening 106 of the sheave 50 is aligned with the aligned through-openings 108 and 110, and then the shank, indicated 112, of the headed bolt 104 is directed shank-end first through each of the aligned through-openings 108, 106 and 110, and a nut 116, with washer 117, is threaded upon the free end, indicated 114, of the bolt shank 112 to secure the sheave 50 to the bracket 52. The sheave 50 is preferably provided with an internal roller bearing 113 (FIG. 8) to facilitate the rotation of the sheave 50 about the bolt shank 112.

To prepare the sheave assembly 20 for use during a wire or cable-pulling operation during which the wire or cable 24 is pulled through the open end 26 of the conduit 26 and with reference again to FIG. 8, the aforementioned gap 96 is created between the stud 70 and the outer surface 68 of the sheave portion 36 by first backing the bolt 84 away from the nut 72 by rotating the bolt head 90 in an appropriate (e.g. counter-clockwise) rotational directional direction with respect to the flange 86 in order to move the bolt in a rightwardly direction as viewed in FIG. 8. With the bolt 84 backed away from the nut 72 in such a manner, the nut 72 and stud 70 is then manually moved (rightwardly as viewed in FIG. 8) along the length of the slot 60 and away from the outer surface 68 to, for example, the FIG. 8 solid-line position and to thereby provide the gap 96. The sleeve portion 36 is directed second end 40-first into the open end 26 of the conduit 22 to the fully-inserted condition, as illustrated in FIG. 9, so that the (FIG. 8) gap 96 accepts the edge 33 of the mouth 27 of the conduit 22 and so that the edge 33 is positioned in abutting relationship with the side surface 61 of the base portion 58 of the bracket 52. At that point, the bolt head 90 is rotated in the appropriate (e.g. clockwise) direction with respect to the flange 86 so that the stud 70 is tightened against the outer surface 68 of the sleeve portion 36 in a manner which sandwiches the edge 33 of the conduit 22 between the stud 70 and the outer surface 68 of the sleeve portion 36 to thereby releasably lock the sheave assembly 20 in its fully-inserted condition at the conduit end 26. The wire or cable 24 desired to be pulled through the conduit 22 can then thereafter be routed across the roller surface 102 and directed along the hollow interior 48 of the sleeve portion 36 for routing through the conduit 22.

Because the roller sheave 50 is free to rotate about the bolt 104 as the wire or cable 24 is pulled across its roller surface 102, the wire or cable 24 is exposed to relatively little drag as it enters the conduit 22, and the roller sheave 50 is advantageous in this respect. Moreover and when the assembly 20 is locked in place within the conduit 22, the disposition of the sheave 50 relative to the mouth 27 of the conduit 22 is advantageous in that a wire or cable 24 which is directed across the roller surface 102 and into the conduit opening 25 is spaced from and is thus prevented from making contact with the edge 33 of the conduit mouth 27 as the wire or cable 24 enters the conduit 22. In some conduits, the edge 33 of the conduit mouth 27 might be relatively sharp and could damage a wire or cable 24 as the wire or cable 24 engages and is pulled across the edge 33. However and since the disposition of the sheave 50 relative to the conduit mouth 25 prevents engagement between the edge 33 and the wire or cable 24 being pulled into the conduit end 26, the wire or cable 24 directed into the conduit end 26 by way of the roller surface 102 cannot be damaged by contact with the edge 33. Along similar lines, the aforedescribed disposition of the sheave 50 relative to the conduit end 26 also prevents the edge 33 from being engaged and damaged by the wire or cable 24 being pulled into the conduit end 26.

Another advantage provided by the sheave assembly 20 relates to the spacing 46 which is defined along the length of the sleeve portion 36 which provides access to the interior 23 of the sleeve portion 36 along a path which extends from the second end 40 to the roller surface 102 of the sheave 50. This spacing 46 thereby enables the sheave assembly 20 to be manipulated into place about a wire or cable 24 (or a rope used to pull the wire or rope through the conduit 22) which leads into the conduit end 26. In other words and in the event that a wire or cable 24 (or a rope) already leads into the conduit end 26 for wire or cable-pulling purposes before the sheave assembly 20 is positioned within the conduit 22, the sheave assembly 20 can thereafter be manipulated into place within the conduit 22 for purposes of guiding the wire, cable or rope across the roller sheave 50 and into the conduit 22.

Figure 10:
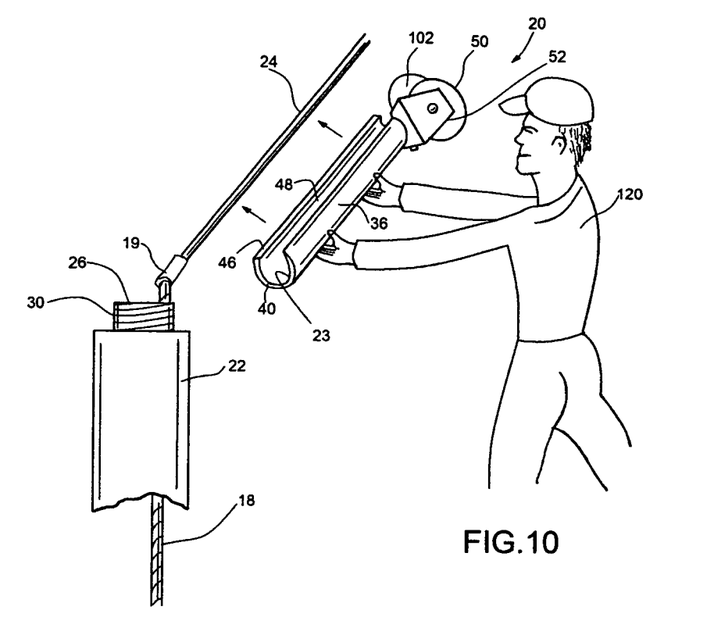
FIGS. 10 and 11 are perspective views illustrating in sequence the manipulation of the FIG. 1 embodiment into place with a wire or cable being readied for pulling the wire or cable into the FIG. 1 conduit.
Figure 11:
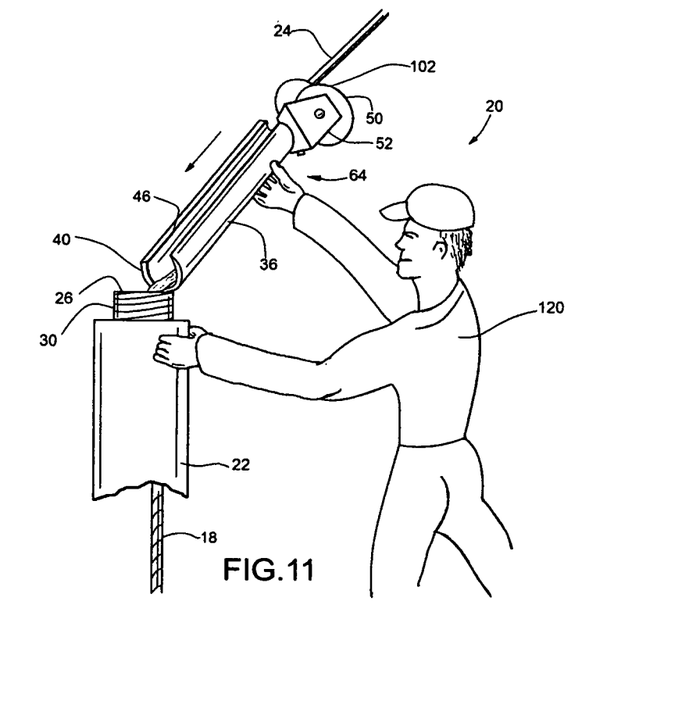

For example and with reference to FIG. 10, there is illustrated a conduit 22 having an end 26 through which a rope 18 has been guided, and the rope 18 has been secured to an end of a cable 24 (e.g. at a coupling 19) for purposes of pulling the cable 24 into the conduit 24 with the rope 18. In order to position the sheave assembly 20 within the conduit 22 so that the cable 24 is routed across the roller sheave 50, an operator 120 can hold the sheave assembly 20 in his hands and can manipulate (as is depicted in FIG. 10) the sheave assembly 200 into its FIG. 9 fully-inserted condition within the conduit 22 by directing the the spacing 46 of the sleeve portion 36 sidewise onto a section, or length, of the wire or cable 24 (or rope 18) which is disposed outside of the conduit 22 so that the wire, cable or rope is thereby disposed within the hollow interior 23 of the sleeve portion 36 and extends from the second end 40 of the sleeve portion 36 to the roller surface 102, as is depicted in FIG. 11. With the section of the wire, cable or rope disposed within the hollow interior 48 of the sleeve portion 36 in such a manner, the sleeve portion 36 of the sheave assembly 20 is then inserted second-end 40-first into the conduit end 26 to the (FIG. 9) fully-inserted condition therein, and then the releasably locking means 64 (including the bolt 84, nut 72 and externally-threaded stud 70 of the depicted assembly 20) is used to releasably secure the sheave assembly 20 to the conduit 22 at the end 26 thereof.

Another advantage provided by the sheave assembly 20 relates to the provision of the external threads disposed about the externally-threaded stud 70 of the releasably locking means 64. In this connection, the male connector end portion 30 of the conduit 22 includes external threads which extend therearound and which are separated by valleys which are substantially V-shaped cross section, and these external threads are engaged by and pressed upon by the outer surface of the stud 70 when the sheave assembly 20 is secured into place within the conduit end 26 by the releasably locking means 64. Meanwhile, the external threads which extend around the stud 70 also have teeth which extend therearound and these teeth can be accepted by the valleys disposed between the teeth, or external threads, of the conduit end portion 30. In other words and as the external threads of each of the stud 70 and the conduit end portion 30 are pressed together as the feeding sheave assembly 20 is locked in place within the conduit end 26, the teeth of the external threads of the stud 70 and the teeth of the external threads of the conduit end 30 are permitted to mesh with one another so that the external threads of the end portion 30 are not likely to be damaged when the outer surface of the stud 70 is pressed against the threads of the end portion 30.

It follows from the foregoing that a feeding sheave assembly 20 has been described which aids in the guiding of a wire or cable 24 being pulled through the feeding, or upstream, end 26 of a conduit 22. The feeding sheave assembly 20 includes an elongated sleeve portion 36 having opposite first and second ends 38 and 40, respectively, and a hollow interior 23 and which is sized to be accepted by the open end 26 of the conduit 22 when the sleeve portion 36 is inserted endwise into the open end 26. In addition, the assembly 20 includes an abutment surface (provided by the side face 61 of the base portion 58 of the bracket 52) which is fixedly secured at the first end 38 of the sleeve portion 36 so that as the sleeve portion 36 is inserted second end 40-first into the open end 26 of the conduit 22 to a fully-inserted condition therein, the abutment surface is positioned in abutting engagement with the open end 26 of the conduit 22 and thereby prevents further insertion of the sleeve portion 26 along the conduit 22.

A sheave 50 is rotatably mounted upon the base portion 58 of the bracket 52 so as to be disposed adjacent a side face thereof opposite the sleeve portion 36 and wherein the sheave 50 has a peripheral roller surface 102 across which the wire or cable is routed during a wire or cable-pulling operation. Moreover, the sheave 50 is disposed in such a relationship with respect to the sleeve portion 36 so that when the sleeve portion 36 is positioned within the open end 26 of the conduit 22 so that the side face 61 of the base portion 58 of the bracket 52 engages the conduit end 26, a wire or cable which is routed across the roller surface 102 of the sheave 50 and into the open end 26 of the conduit 26 is prevented from engaging the edge 33 which encircles the conduit mouth 27. The assembly 20 also includes means 64 associated with the bracket 52 for releasably locking the sleeve portion 36 in a stationary relationship with respect to the conduit end 26 when the sleeve portion 36 is positioned in its fully-inserted condition within the conduit 22.

Exemplary dimensions of the feeding sheave assembly 20 are provided here for use with a conduit 20 which measures about four inches in diameter. The length of the sleeve portion 36 is at least about ten inches; the diameter of the sleeve portion 36 is about 3.7 inches; the largest diameter of the sheave 50 is about five inches; and the width of the base portion 58 of the bracket 52 (corresponding with the spaced-apart distance between the leg portions 54 and 56 of the bracket 52) is about five inches.

It will be understood that numerous modifications and substitutions can be had to the aforedescribed embodiment 20 without departing from the spirit of the invention. Accordingly, the aforedescribed embodiment 20 is intended for the purpose of illustration and not as limitation.

The invention claimed is:

1. A feeding sheave assembly for use at the open end of a conduit into which a wire or cable is to be fed during an operation involving the pulling of the wire or cable through the conduit wherein the conduit end is encircled by an edge, the feeding sheave assembly comprising:
    an elongated sleeve portion having opposite first and second ends and a hollow interior and which is sized to be accepted by the hollow interior of the conduit when the sleeve portion is inserted endwise into the open end of the conduit;
    means defining an abutment surface at the first end of the sleeve portion so that when the sleeve portion is inserted second-end first into the open end of the conduit toward a fully-inserted condition within the hollow interior of the conduit, the abutment surface is moved into abutting engagement with the open end of the conduit and thereby prevents further insertion of the sleeve portion into the conduit beyond the fully-inserted condition;
    a sheave which is rotatably mounted upon the abutment surface-defining means and wherein the sheave has a peripheral roller surface across which the wire or cable is routed during a wire or cable-pulling operation; and
    the sheave is disposed in such a relationship with respect to the sleeve portion so that when the sleeve portion is positioned in the fully-inserted condition within the hollow interior of the conduit, a wire or cable which is subsequently routed across the roller surface of the sheave and directed into the open end of the conduit is prevented from engaging the edge which encircles the open end of the conduit; and
    means for releasably locking the sleeve portion in a stationary relationship with respect to the conduit when the sleeve portion is positioned in the fully-inserted condition within the hollow interior of the conduit; and
    wherein the sleeve portion has a length which extends between the first and second ends and is substantially C-shaped in cross section along the entire length of the sleeve portion so as to provide an access slot which extends between the first and second ends and through which the wire or cable can be accepted by or removed from the sleeve portion when the sleeve portion is manipulated sidewise onto a length of the wire or cable or is moved sidewise off of the length of the wire or cable.

2. The feeding sheave assembly as defined in claim 1 wherein the abutment surface-defining means is provided by a bracket which is U-shaped in cross section having a pair of leg portions and a base portion which extends between the leg portions, and the base portion has one side face from which the two leg portions extend and another side face opposite said one side face which is positioned against and joined to the first end of the sleeve portion and which provides the abutment surface of the abutment surface-defining means, and the sheave is rotatably mounted between the pair of leg portions of the bracket.

3. The feeding sheave assembly as defined in claim 2 wherein the base portion defines a cutout therein having edges which substantially conform with the cross-sectional shape of the sleeve portion at the first end thereof so that the sidewise manipulation of the sleeve portion onto or off of the length of the wire or cable as aforesaid is not obstructed by the base portion.

4. The feeding sheave assembly as defined in claim 3 wherein the sleeve portion has an outer surface, the base portion defines an elongated slot which communicates between the one and another side faces of the base portion, is disposed outboard of the sleeve portion and extends along a path directed substantially toward and away from the outer surface of the sleeve portion, and
    wherein the means for releasably locking includes a stud member which is positioned within the elongated slot of the base portion and further includes means for moving the stud member along the length of the slot toward the outer surface of the sleeve portion so that by positioning the sleeve portion in its fully-inserted condition within the hollow interior of the conduit so that the conduit is disposed between the outer surface of the sleeve portion and the stud member, the means for moving can be utilized to move the stud member toward the outer surface of the sleeve portion to thereby sandwich the conduit between the outer surface and the stud member and thereby lock the feeding sheave assembly to the conduit.

5. The feeding sheave assembly as defined in claim 4 wherein the stud member includes an externally-threaded stud having external threads having teeth which are adapted to mesh with any external threads which extend around the open end of the conduit.

6. The feeding sheave assembly as defined in claim 4 further including means defining a guideway which is attached to the base portion of the bracket so as to extend along the length of the elongated slot defined in the base portion, and
    wherein the assembly further includes a nut having an internal opening within which the stud member is secured, and the nut is adapted to cooperate with the guideway-defining means so that as the stud member is moved toward the outer surface of the sleeve portion as aforesaid, the nut is guided along the length of the elongated slot by the guideway-defining means.

7. The feeding sheave assembly as defined in claim 6 wherein the nut is disposed adjacent the one side face of the base portion, and the means for moving includes a bolt which is mounted for movement relative to the base portion so that the movement of the bolt relative to the base portion effects the movement of the nut along the guideway of the guideway-defining means.

8. The feeding sheave assembly as defined in claim 7 wherein the bolt has a head and a shank, and the assembly further includes a flange portion which is attached to the base portion and defines an internally-threaded opening within the shank of the bolt is threadably received so that the rotation of the head of the bolt relative to the flange portion in one rotational direction with respect to the flange portion moves the bolt relative to the base portion to thereby move the nut along the guideway of the guideway-defining means.

9. A feeding sheave assembly for use at the open end of a conduit into which a wire or cable is desired to be fed during a wire or cable-pulling operation and wherein the conduit end is encircled by an edge, the feeding sheave assembly comprising:

an elongated sleeve portion having opposite first and second ends and a hollow interior extending between the first and second ends, the sleeve portion defining an outer surface and being sized to be accepted endwise by the hollow interior of the conduit;

a U-shaped bracket having a pair of leg portions and a base portion which extends between the pair of leg portions, and the base portion has two opposite side faces and wherein the pair of leg portions extend from one side face of the two opposite side faces of the base portion;

a sheave which is rotatably mounted between the pair of leg portions of the bracket and wherein the sheave has a peripheral roller surface across which the wire or cable is routed during a wire or cable-pulling operation; and the first end of the sleeve portion is fixedly attached to the side face of the base portion opposite said one side face so that the leg portions of the U-shaped bracket extend axially away from the sleeve portion opposite the second end thereof; and means associated with the U-shaped bracket for releasably locking the feeding sheave assembly in a stationary relationship with the conduit, the releasably locking means including A) a clamp member which is mounted upon the U-shaped bracket for movement toward and away from the outer surface of the open end of the conduit between a first condition at which the edge encircling the conduit end is positionable between the outer surface of the sleeve portion and the clamp member and a second condition at which the edge encircling the conduit end is clamped between the outer surface of the sleeve portion and the clamp member, and B) means for urging the clamp member from the first condition toward the second condition for purposes of clamping the edge of the conduit end between the clamping member and the outer surface of the sleeve portion;

the sheave is disposed in such a relationship to the open end of the conduit so that when the feeding sheave assembly is locked to the edge encircling the conduit end as aforesaid, a wire or cable which is fed into the conduit end during a wire or cable-pulling operation moves across and then off of the peripheral roller surface of the sheave before moving into the conduit end; and wherein the sleeve portion has a length which extends between the first and second ends and is substantially C-shaped in cross section along the entire length of the sleeve portion so as to provide an access slot which extends between the first and second ends of the sleeve portion and through which the wire or cable can be accepted by or removed from the sleeve portion when the sleeve portion is manipulated sidewise onto a length of the wire or cable or is moved sidewise off of the length of the wire or cable.

10. The feeding sheave assembly as defined in claim 9 wherein the sheave is disposed in such a relationship to the open end of the conduit so that during a wire or cable-pulling operation during which the wire or cable is fed into the open end of the conduit, the wire or cable is prevented from contacting the edge encircling the conduit end.

11. The feeding sheave assembly as defined in claim 9 wherein the base portion defines a cutout therein having edges which substantially conform with the cross-sectional shape of the sleeve portion at the first end thereof so that the manipulation of the sleeve portion onto or off of the wire or cable as aforesaid is not obstructed by the base portion.

12. The feeding sheave assembly as defined in claim 11 wherein the sleeve portion has an outer surface, the base portion defines an elongated slot which communicates between the two opposite side faces of the base portion is disposed outboard of the sleeve portion and extends along a path which is directed substantially toward and away from the outer surface of the sleeve portion, and wherein the means for releasably locking includes a stud member which cooperates with the elongated slot of the base portion and further includes means for moving the stud member along the length of the slot toward the outer surface of the sleeve portion so that by positioning the sleeve portion in the fully-inserted condition within the hollow interior of the conduit so that the conduit is disposed between the outer surface of the sleeve portion and the stud member, the stud member can be moved by the moving means along the length of the slot toward the outer surface of the sleeve portion to thereby sandwich the conduit between the outer surface and the stud member and thereby lock the feeding sheave assembly to the conduit.

13. The feeding sheave assembly as defined in claim 12 wherein the stud member is in the form of an externally-threaded stud having external threads having teeth which are adapted to mesh with any external threads which extend around the open end of the conduit.

14. The feeding sheave assembly as defined in claim 12 further including means defining a guideway which is attached to the base portion of the bracket along the one side face thereof so as to extend along the length of the elongated slot defined in the base portion, and wherein the assembly further includes a nut having an internal opening within which the stud member is secured, and the nut is adapted to cooperate with the guideway-defining means so that as the stud member is moved toward the outer surface of the sleeve portion as aforesaid, the nut is guided along the length of the elongated slot by the guideway-defining means.

15. The feeding sheave assembly as defined in claim 14 wherein the guideway-defining means includes a pair of guide rails which extend along the one side face of the base portion and on opposite sides of the elongated slot, and the nut includes a main body and a pair of wing portions which extend outwardly from the main body of the nut, and the wing portions are slidably received by the guide rails to permit the nut to be slidably moved along the length of the elongated slot as the wing portions are guided along the length of the guide rails.

16. The feeding sheave assembly as defined in claim 14 wherein the nut is disposed on the one side face of the base portion, and the means for moving includes a bolt which is mounted for movement relative to the base portion so that the movement of the bolt relative to the base portion effects the movement of the nut along the guideway of the guideway-defining means.

17. The feeding sheave assembly as defined in claim 16 wherein the bolt has a head and a shank, and the assembly further includes a flange portion which is attached to the base portion and defines an internally-threaded opening within the shank of the bolt is threadably accepted so that by rotating the head of the bolt relative to the flange portion in one rotational direction with respect thereto moves the shank of the bolt relative to the base portion for moving the nut along the guideway of the guideway-defining means.

18. A feeding sheave assembly for use at the open end of a conduit into which a wire or cable is desired to be fed during a wire or cable-pulling operation and wherein the conduit end is encircled by an edge, the feeding sheave assembly comprising:

an elongated sleeve portion having opposite first and second ends and a hollow interior extending between the first and second ends, the sleeve portion defining an outer surface and being sized to be accepted endwise by the hollow interior of the conduit;

a U-shaped bracket having a pair of leg portions and a base portion which extends between the pair of leg portions, and the base portion has two opposite side faces and wherein the pair of leg portions extend from one side face of the two opposite side faces of the base portion;

wherein the sleeve portion has a length which extends between the first and second ends and is substantially C-shaped in cross section along the entire length of the sleeve portion so as to provide an access slot which extends between the first and second ends and through which the wire or cable can be accepted by or removed from the sleeve portion when the sleeve portion is manipulated sidewise onto a length of the wire or cable or is moved sidewise off of the length of the wire or cable;

wherein the base portion defines a cutout therein having edges which substantially conform with the cross-sectional shape of the sleeve portion at the first end thereof so that the sidewise manipulation of the sleeve portion onto or off of the length of the wire or cable as aforesaid is not obstructed by the base portion;

a sheave which is rotatably mounted between the pair of leg portions of the bracket and wherein the sheave has a peripheral roller surface across which the wire or cable is routed during a wire or cable-pulling operation; and the first end of the tubular sleeve is fixedly attached to one side face of the two opposite side faces of the base portion of the U-shaped bracket so that the leg portions of the U-shaped bracket extend axially away from the sleeve portion opposite the second end thereof; and means associated with the U-shaped bracket for releasably locking the U-shaped bracket in a stationary relationship with the conduit, the releasably locking means including a clamp member which is mounted upon the U-shaped bracket for movement toward and away from the outer surface of the open end of the conduit between a first condition at which the edge which encircles the conduit end is positionable between the outer surface of the sleeve portion and the clamp member and a second condition at which the edge which encircles the conduit end is clamped between the outer surface of the sleeve portion and the clamp member, and means for moving the clamp member from the first condition toward the second condition for purposes of clamping the edge of the conduit end between the clamping member and the outer surface of the sleeve portion;

the sheave is disposed in such a relationship to the open end of the conduit so that when the sleeve portion is clamped to the edge which encircles the conduit end as aforesaid, a wire or cable which is directed into the conduit end during a wire or cable-pulling operation moves across and then off of the peripheral roller surface of the sheave before moving into the conduit end.

* * * * *